April 10, 1945. H. GAMACHE 2,373,182
CUTTER AND CRIMPER FOR RAVIOLI AND PASTRIES
Filed Dec. 9, 1943
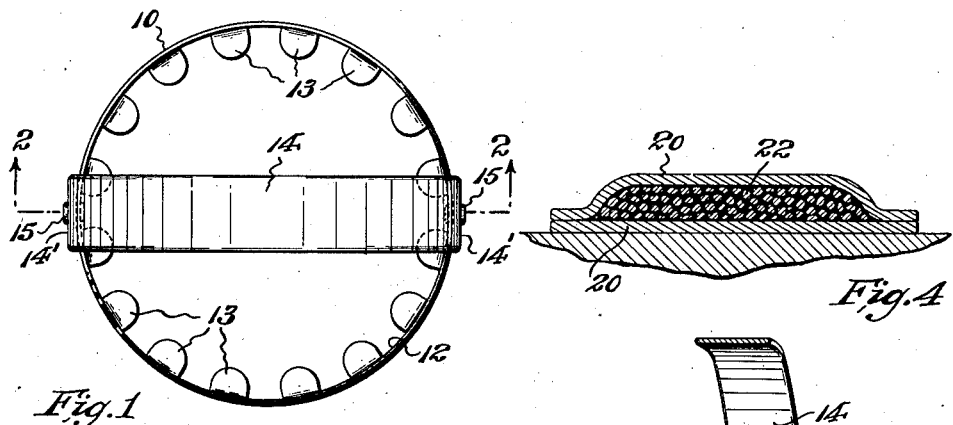
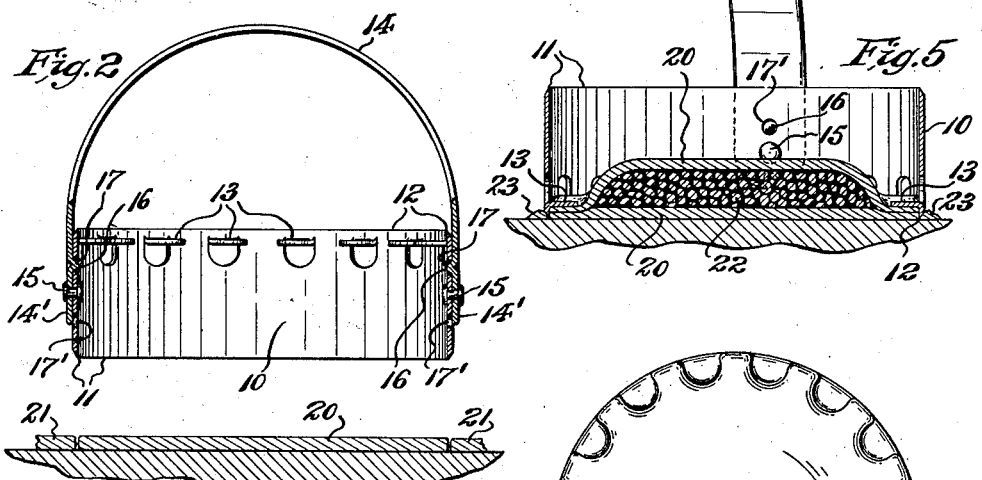
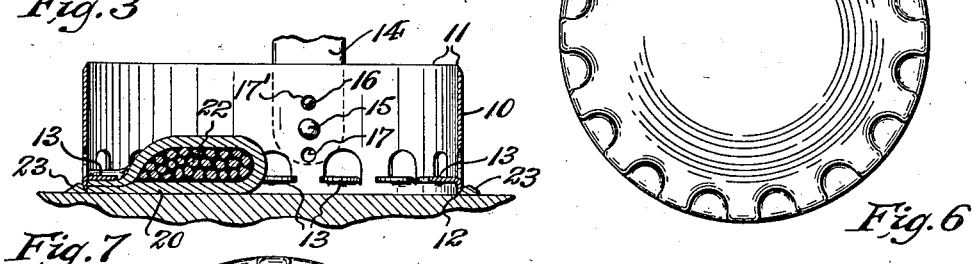
INVENTOR.
Homer Gamache,
BY George D. Richards
ATTORNEY.

Patented Apr. 10, 1945

2,373,182

UNITED STATES PATENT OFFICE 2,373,182

CUTTER AND CRIMPER FOR RAVIOLI AND PASTRIES

Homer Gamache, Newark, N. J., assignor to Acme Metal Goods Manufacturing Co., Newark, N. J., a firm composed of August C. Fischer, Charles F. Fischer and Harry F. Fischer Application December 9, 1943, Serial No. 513,590

2 Claims. (Cl. 107—47)

This invention relates to improvements in kitchen implements, and the invention has reference, more particularly, to a novel construction of cutting and crimping device for preparing ravioli and for cutting and/or crimping dough for pastries, cookies and the like.

The invention has for an object to provide a novel reversible dough cutting and crimping implement one end of which is adapted for cutting forms out of sheet dough, and the other end of which is adapted for crimping and trimming the dough forms or assemblies thereof used in preparing ravioli and other similar pastries, cookies and similar products.

The invention has for another object to provide a novel implement comprising an endwise open cutter body of suitable peripheral shape, specifically of circular shape, each end being sharpened to provide the same with a peripheral cutting edge, and said body having struck therefrom a series of spaced crimping tongues to project inwardly from and around the inside of the cutter body in a plane spaced adjacently above and parallel to one of the cutting edges at an end of said body.

The invention has for a further object to provide the body of an implement of the kind mentioned with a reversible handle means by which the same can be manipulated in use, together with detent means to releasably hold said handle means and selectively positioned to permit use of a selected operative end of the body.

Other objects of this invention, not at this time more particularly enumerated, will be understood from the following detailed description of the same.

An illustrative embodiment of the invention and manner of using the same is shown in the accompanying drawing, in which:

Fig. 1 is a plan view of the implement according to this invention and in the working position thereof shown in Fig. 2; and Fig. 2 is a vertical sectional view, taken on line 2—2 in Fig. 1.

Fig. 3 is a vertical sectional view of a form cut from sheet dough by the implement when in the working position shown in Fig. 2.

Fig. 4 is a vertical sectional view of a ravioli assembly formed by a plurality of dough forms, such as shown in Fig. 3, and prior to crimping and sealing the assembled dough forms around the filled interior thereof.

Fig. 5 is a vertical sectional view of the implement in reversed position and as operatively applied to the ravioli assembly of Fig. 4 for the crimping and sealing or welding of the dough forms thereof.

Fig. 6 is a plan view of the ravioli assembly after its dough forms are crimped and sealed or welded.

Fig. 7 is a view similar to that of Fig. 5, but showing the implement operating upon another ravioli assembly utilizing a single dough form doubled upon itself; and Fig. 8 is a plan view of the latter type of ravioli assembly.

Similar characters of reference are employed in the above described views, to indicate corresponding parts.

Referring to the drawing, the implement comprises an annular body 10 of suitable length or height, preferably, although not necessarily, of cylindrical shape. Said body is provided along the periphery of one end thereof with a sharpened cutting edge 11, and, in like manner, is also provided along the periphery of the opposite end thereof with a second sharpened cutting edge 12. The body 10 is preferably made of sheet metal, although it may be made of any other suitable material. Struck out of the body 10, or otherwise suitably formed in connection therewith, are a series of circumferentially spaced crimping tongues 13 arranged to project radially inward from the body walls adjacently above and parallel to the plane of one of the cutting edges at an end of the body, e. g., adjacent to the second sharpened cutting edge 12. Said tongues 13 may be of any desired peripheral shape.

Connected with said body 10 is a reversible handle means for manipulating the same; said handle means preferably being in the form of a semi-circular bail 14 adapted to straddle the body diametrically. Said bail 14 is of suitable width and its ends 14' overlie the outer surface of the body 10, being pivotally connected to the body by pivoting pins or rivets 15. As thus assembled and related to the body said bail 14 may be swung about its pivotal connection with the latter so as to optionally dispose the same across either cutting end of the body, whereby to downwardly and freely present the opposite cutting end of said body for use. Detent means is provided for releasably holding the handle bail 14 in selectively disposed relation to the body 10. An illustrative form of such detent means, as shown, comprises a rounded latch projection, tit or nipple 16 extending inwardly from an end portion 14' of the handle bail toward the contiguous wall of the body 10, and in spaced or offset relation to the pivotal connection of said bail end portion with said body 10. Said body 10 is provided with receiving openings or sockets 17 and 17' respectively disposed intermediate the pivotal connection of said bail end portion and the respective cutting ends of the body 10. As shown the receiving opening or socket 17 lies between the bail pivot connection and the second cutting edge 12 of the body, so as to receive the latch projection 16 when the handle bail is disposed across the cutting edge 12, in which position the body cutting edge 11 is downwardly presented for use when the implement is manipulated by the thus disposed handle bail. The other receiving opening or socket 17' lies between the bail pivot connection and the first cutting edge 11 of the body, so as to receive the latch projection 16 when the handle bail is disposed across said cutting edge 11, in which position the body cutting edge 12 and the crimping tongues 13 are downwardly presented for use when the implement is manipulated by the thus disposed handle bail. Said detent means may be provided in connection with one or both end portions 14' of the handle bail.

In the use of the implement for preparing ravioli or similar filled pastries, the handle bail is disposed in position to present the body 10 with its cutting edge 11 downwardly and freely presented for use (see Figs. 1 and 2). With the implement thus arranged, forms or disks 20 may be cut out of a dough sheet 21 (see Fig. 3) by forcing the cutting edge 11 downwardly through the latter. Two such forms or disks 20 may be superposed with a desired filling substance 22 deposited therebetween, but so that the marginal edge portions of the forms or disks 20 may be closed together around the filling substance 22 (see Fig. 4). This having been done, the implement is arranged for application to the filled dough for crimping, welding or sealing together the marginal edge portions of the forms or disks 20. To this end the handle bail is reversed so as to dispose the body 10 with its cutting edge 12 and the crimping tongues 13 downwardly presented for use, whereupon the implement is applied to the filled dough and pressed downwardly thereupon. By such operation, the crimping tongues 13 are forced downwardly against the superposed marginal edge portions of the forms or disks 20 with squeezing and crimping effect thereupon, whereby said edge portions are welded and sealed together. At the same time the cutting edge 12 trims away any excess dough 23 which is squeezed out by the crimping action (see Fig. 5). Upon completion of this operation the ravioli or other similar pastry is made ready for cooking (see Fig. 6).

Ravioli, turn-overs and like pastry forms may be prepared from a single form or disk of dough 20 cut out of a dough sheet by the cutting edge 11, in which case the single form or disk 20 may be folded upon itself over the inserted filling material 22, but so as to close together the meeting marginal edge portions of the form or disk 20; whereupon, by reversing the implement, said edges may be crimped, welded, and trimmed by application thereto of the crimping tongues 13 and cutting edge 12 (see Fig. 7), thus producing a ravioli form or similar pastry ready for cooking (see Fig. 8).

It will be obvious that the implement may be employed for many other similar operations, as e. g. cutting out cookies from dough sheets, either in plain or crimped edge form, and for many like operations.

From the above it will be understood that the invention provides a very handy kitchen implement for the purposes described.

Having described my invention, I claim:

1. An implement for the purposes described comprising a reversible endwise open body terminating in cutting edges at its respective ends, said body having a series of circumferentially spaced crimping tongues struck out of the material of said body to project radially inward therefrom in a plane substantially parallel to and spaced closely adjacent to the plane of the cutting edge at one end of said body.

2. An implement for the purposes described comprising a reversible body, a transverse handle bail having its end portions respectively pivotally connected to opposite sides of the body intermediate the ends thereof, and detent means for releasably holding said handle bail and body in selectively adjusted relation, said detent means comprising latch means inwardly projecting from the handle bail in spaced relation to the pivotal connection thereof with the body, and said body having selectively engageable latch receiving sockets respectively disposed between the pivotal connection of the handle bail therewith and the respective ends of the body.

HOMER GAMACHE.